May 31, 1927.
G. H. DAUGHERTY
1,630,730
SIGNALING DEVICE
Filed May 10, 1926
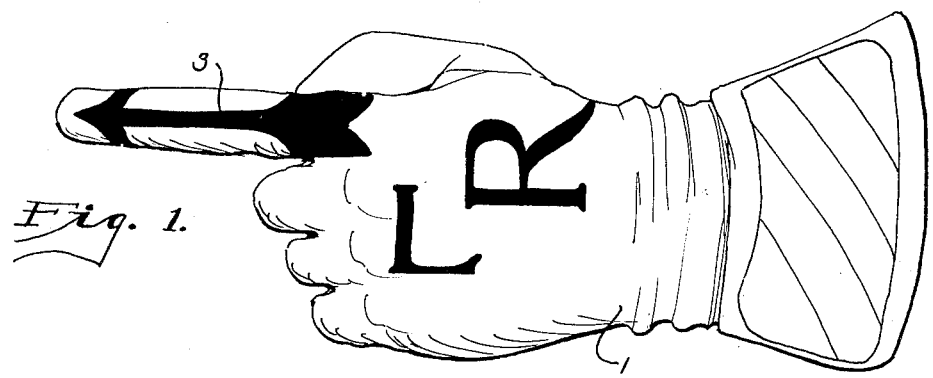
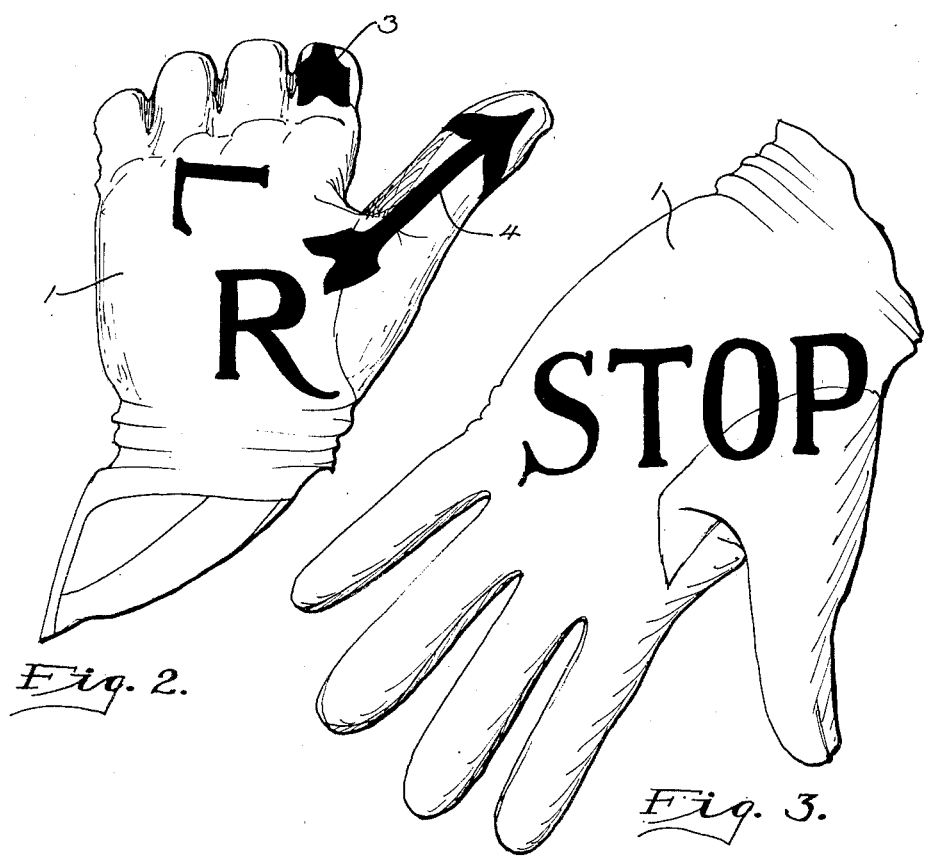
INVENTOR.
GEO. H. DAUGHERTY.
BY
ATTORNEYS.

Patented May 31, 1927.

1,630,730

UNITED STATES PATENT OFFICE.

GEORGE H. DAUGHERTY, OF BERKELEY, CALIFORNIA.

SIGNALING DEVICE.

Application filed May 10, 1926. Serial No. 107,969.

The present invention relates to improvements in signaling devices and has particular reference to a glove adapted to be used by the driver of a motor vehicle and arranged to represent characters thereon designed to facilitate the reading of the sign given by the driver. It is well known that certain rules have been generally adopted giving certain meanings to motions made by the left hand of a motor vehicle driver. Pointing the hand and arm downwardly indicates an intended stop, holding the arm and hand in a substantially horizontal position means an intended turn to the left and holding the hand and arm in an upright position means an intended turn to the right.

It is proposed in the present invention to aid the driver of a motor vehicle driving behind another one to interpret the signals given by the first driver by providing a glove with characters thereon indicating the intended turn or stop even to a person not familiar with the rules of the signals pointed out previously.

It is particularly proposed to arrange the characters on the glove in such a manner that they occupy a correct reading position when the hand is held in the correct position for giving the intended signal.

Further objects and advantages of my invention will appear as the specification proceeds.

The preferred form of my invention is illustrated in the accompanying drawing in which Figure 1 shows the glove in a position indicating an intended left hand turn, Figure 2 shows the glove in a position indicating a right hand turn, Figure 3 shows the glove in a position indicating stop.

While I have shown only the preferred form of the invention I wish to have it understood that various changes or modifications may be made within the scope of the claims attached hereto, without departing from the spirit of the invention.

My glove 1 may be of any suitable construction and is preferably of the type used by drivers of motor vehicles. It has printed on the back thereof the two letters L and R in such a manner that the L occupies the correct reading position when the hand wearing the glove points sidewise in a manner shown in Figure 1 while the letter R is placed to be in a correct reading position when the hand points upwardly as shown in Figure 2. An arrow 3 is preferably marked on the forefinger to point outwardly it being natural for the driver to point to the left with his fore-finger when intending to make a left-hand turn.

A similar arrow 4 is placed on the thumb to point upwardly and to the right when the hand is held to indicate a right hand turn, it being natural for the driver to point the thumb in the direction in which he is to go.

The customary signal for indicating stop is the hand and arm pointing downwardly in which position it is natural to present the palm of the hand rearwardly. Characters indicating stop are therefore marked on the palm of the glove in such a manner as to be in a correct reading position when the hand is held to give the commonly accepted stop signal.

It should be understood in this connection that while the different characters may be printed on the glove they may be applied in any other suitable manner and may be made of glass or luminous material showing up in the dark. It should also be understood that while the characters selected seem to particularly fit the intended purpose this invention is not to be construed as being confined to the particular characters selected.

I claim

1. A signaling device of the character described, comprising a glove adapted to fit the signaling hand of the driver of a motor vehicle and having a plurality of direction indicating characters marked on one face thereof the said characters being arranged in different reading positions so as to allow each character to assume a correct readable position when the hand is held to give the signal corresponding to said character.

2. A signaling device of the character described, comprising a glove adapted to fit the signaling hand of the driver of a motor vehicle having a L and an R marked on the back thereon, the L being arranged to be in correct reading position when the hand points sideway and the R being arranged for correct reading position when the hand points upward.

3. A glove as defined in claim 2 in which characters indicating stop are marked on the inner face of the glove and arranged to be in correct reading position when the hand points downwardly with the palm to the rear.

4. A glove as defined in claim 2 in which arrows are marked on the forefinger and thumb of the glove to facilitate the reading of the signals given thereby.

In testimony whereof I affix my signature.

GEORGE H. DAUGHERTY.